No. 645,880. Patented Mar. 20, 1900.
C. E. VARNUM.
FLY TRAP.
(Application filed Oct. 21, 1899.)
(No Model.) 3 Sheets—Sheet 1.

WITNESSES:
Jos. A. Ryan
Perry B. Turpin

INVENTOR
Charles E. Varnum
BY Munn & Co.
ATTORNEYS

No. 645,880. Patented Mar. 20, 1900.
C. E. VARNUM.
FLY TRAP.
(Application filed Oct. 21, 1899.)
(No Model.) 3 Sheets—Sheet 2.

WITNESSES:
Jos. A. Ryan
Perry B. Turpin

INVENTOR
Charles E. Varnum
BY
ATTORNEYS

No. 645,880. Patented Mar. 20, 1900.
C. E. VARNUM.
FLY TRAP.
(Application filed Oct. 21, 1899.)
(No Model.) 3 Sheets—Sheet 3.

WITNESSES:
Jos. A. Ryan
Perry B. Turpin

INVENTOR
Charles E. Varnum
BY Munn & Co.
ATTORNEYS

UNITED STATES PATENT OFFICE.

CHARLES E. VARNUM, OF VINLAND, KANSAS.

FLY-TRAP.

SPECIFICATION forming part of Letters Patent No. 645,880, dated March 20, 1900.

Application filed October 21, 1899. Serial No. 734,352. (No model.)

*To all whom it may concern:*

Be it known that I, CHARLES E. VARNUM, residing at Vinland, in the county of Douglas and State of Kansas, have made certain new and useful Improvements in Fly-Traps, of which the following is a specification.

My invention is an improvement in fly-traps, and has for an object to provide a construction through which cows and other animals may pass and in which the flies will be brushed therefrom and pass into traps arranged to receive them and which may be removed in order to dispose of the flies in any desired manner.

The invention consists in certain novel constructions and combinations of parts, as will be hereinafter described, and pointed out in the claims.

Figure 1:
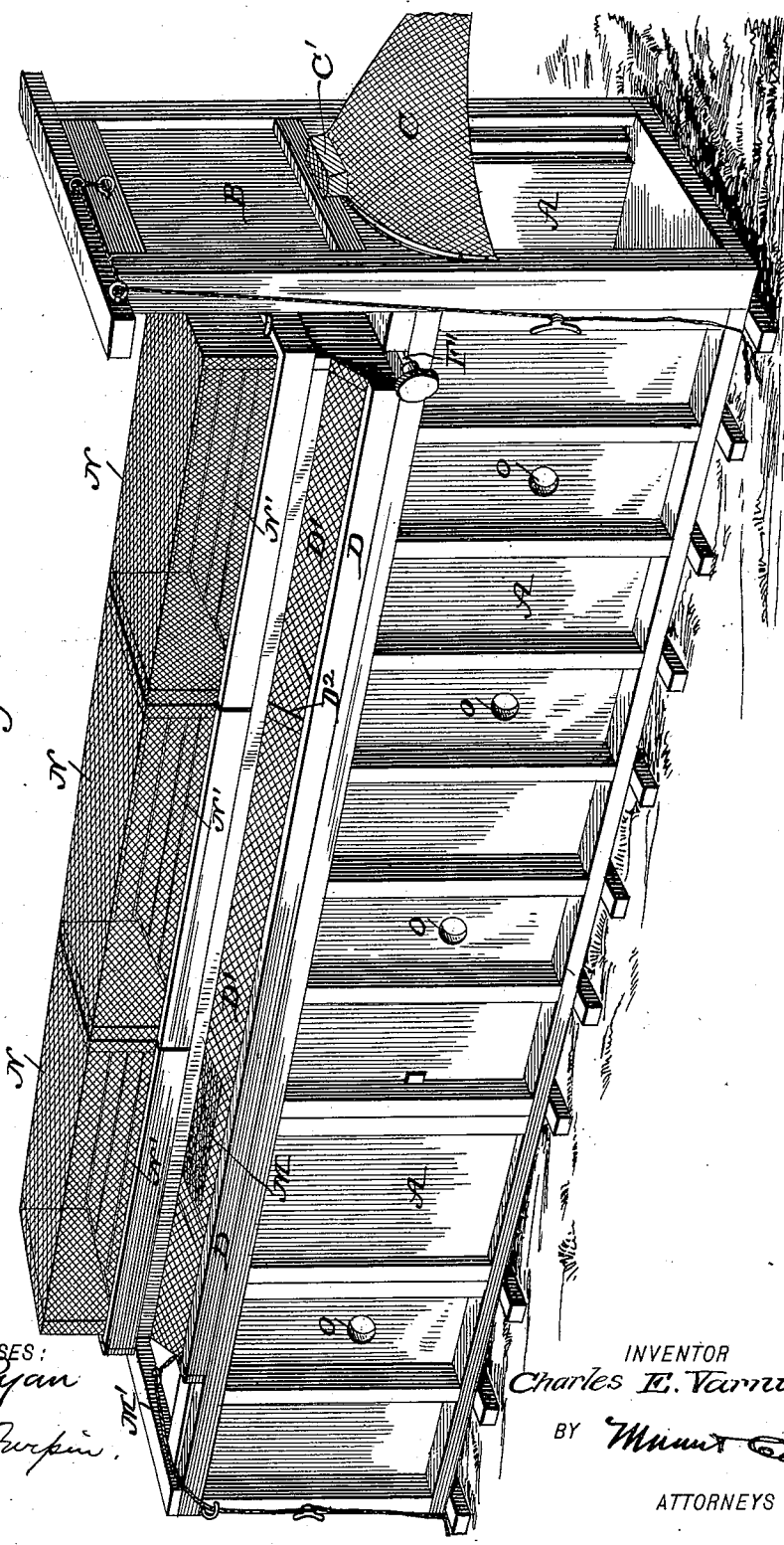
Figure 2:
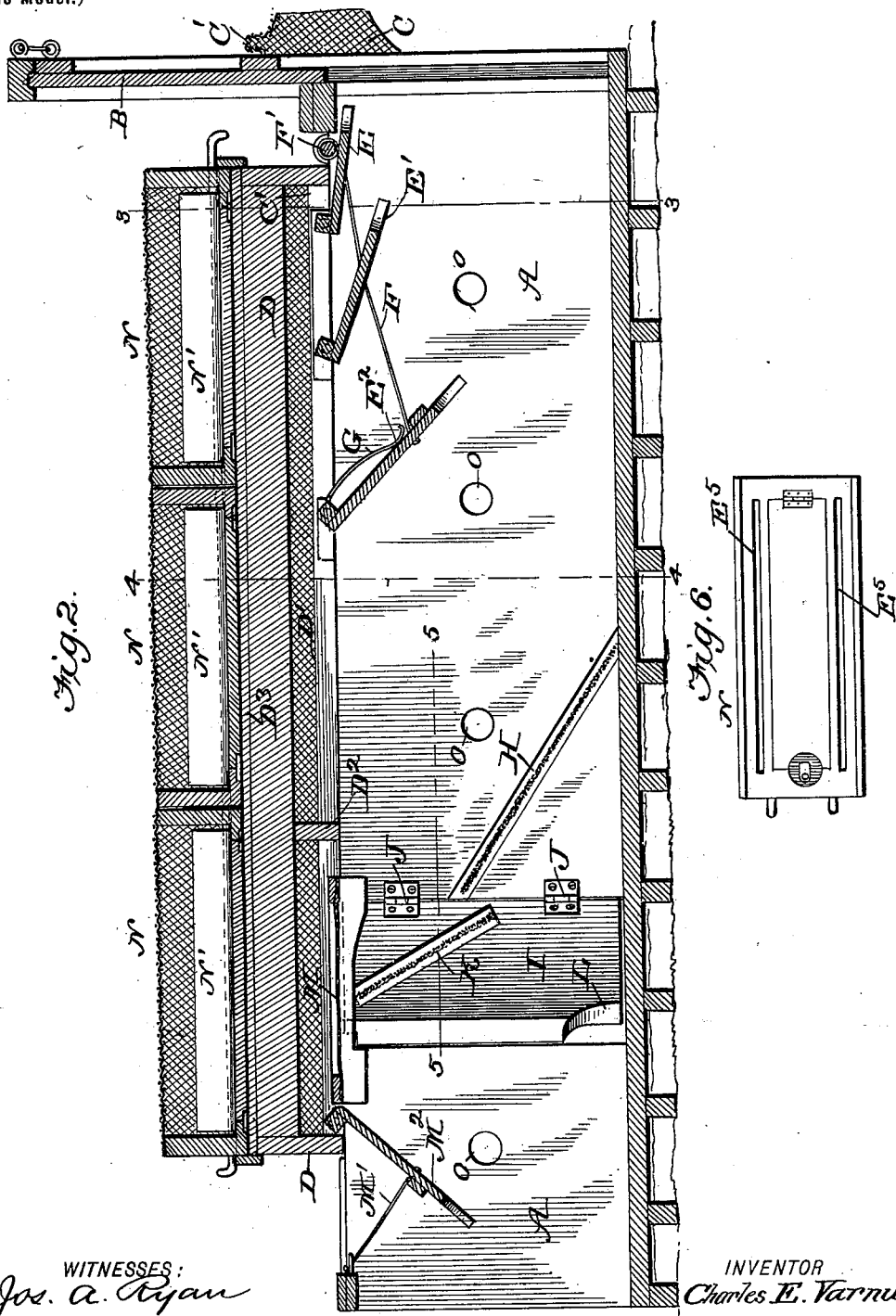
Figure 3:
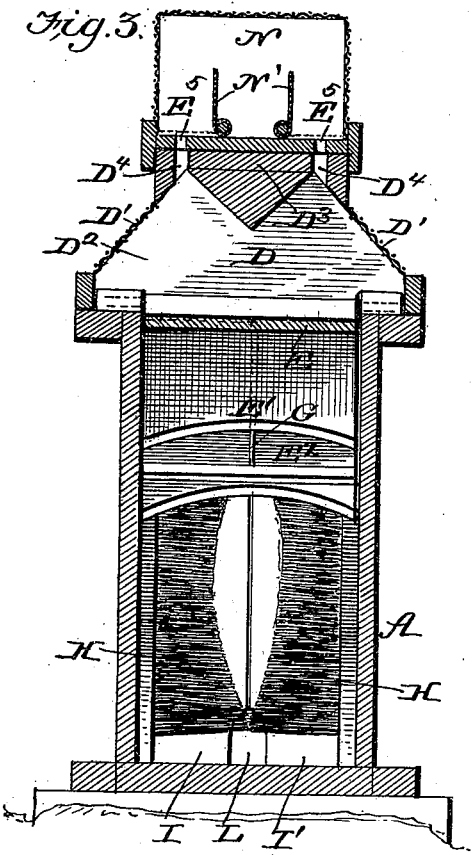
Figure 4:
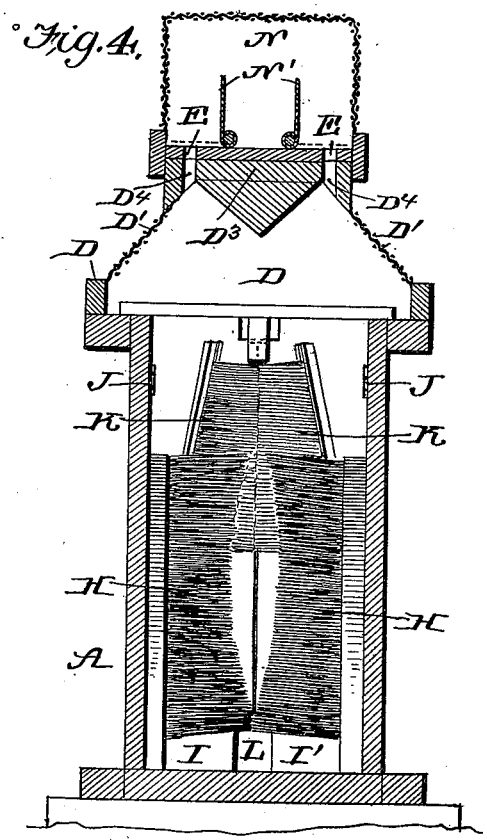
Figure 5:
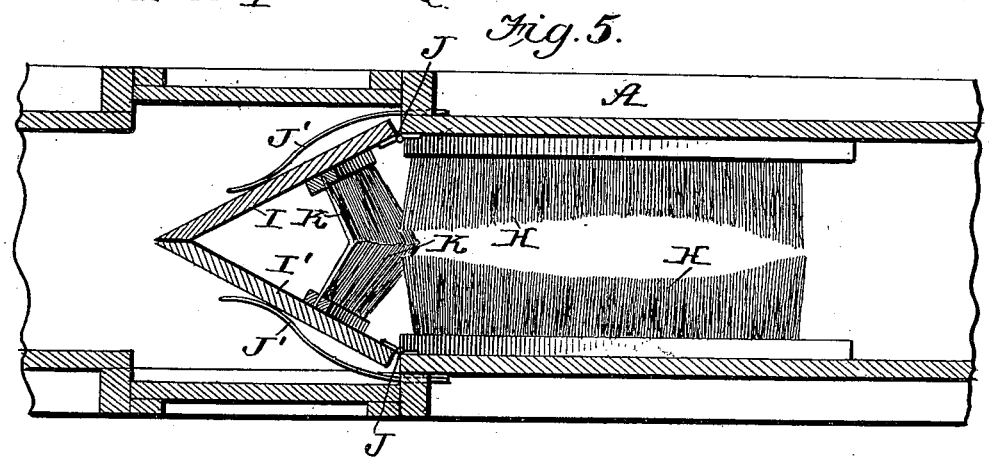

In the drawings, Figure 1 is a perspective view of a trap embodying my invention. Fig. 2 is a vertical longitudinal section of the trap. Figs. 3 and 4 are cross-sectional views on, respectively, about lines 3 3 and 4 4 of Fig. 2. Fig. 5 is a detail horizontal section on about line 5 5 of Fig. 2, and Fig. 6 is a detail view.

In carrying out my invention I provide a chute A, through which the animals may pass. The entrance of this chute is controlled by a vertically-sliding door B, at the outside of which I provide a trapping-hood C, having a connected trap C'. The purpose of this hood C is to catch such flies as may be frightened off the animal while entering the chute. Slightly in rear of the entrance I provide the shades E, E', and E², which darken the chute in front of the brushes, are pivoted at their upper ends, and are of different lengths, as shown. These shades are arranged to be lifted against the action of the spring G by the cord F, operated by the windlass-shaft F', and the object of these shades is to darken the space in front of brushes, so the flies will rise to the light above, as will be understood from the drawings.

Brushes H H are arranged in the chute in rear of the shades. These brushes project inwardly from the opposite sides of the chute and incline rearwardly from their lower toward their upper ends and are shown as formed with their brushing edges slightly concaved. These brushes conform generally to the cross-section of the animal as it passes between them and operate efficiently in removing all the flies, which pass upward into the trapping-compartment D, before referred to. Immediately in rear of the inclined brushes I provide the hinged doors I I'. These doors are hinged at their front edges at J to the chute and are pressed toward each other at their rear ends by the springs J'. The doors thus converge toward their rear edges and are provided on their inner forward faces next to the inclined brushes with brushes K, which coöperate in removing the flies.

The meeting edges of the doors I and I' are cut away at their lower ends at L, forming an opening for the nose of the animal as it passes through the chute. The space immediately above the doors I and I' is closed by a suitable cover M, so the flies removed by such doors will be forced to pass toward the front of the chute to enter the main trapping-compartment D, before described.

A light-shield M² is arranged in rear of the doors I and I', its purpose being to exclude the light from the rear end of the chute, so the flies will pass up into the main trapping-compartment D. The shield M² is hinged at its upper end and may be raised and lowered by means of the cord M'.

The main trapping-compartment D fits over the chute and may preferably be readily detachable therefrom. This compartment extends from immediately in rear of the entrance-door to a point over the light-shield M², has screen sides D', cross-partitions D², and a top D³, provided with slots D⁴, which communicate with slots E⁵ in the trap-boxes N, which are fitted removably upon the compartment D. These trap-boxes are made of such size that they can be readily removed, and I provide them with the hinged plates N', which may be turned to open the slots E⁵ to permit the entrance of the flies and to close such slots when it is desired to remove the trap-boxes in order to dispose of the files, as may be desired. The compartment D may be regarded as the trap proper and the trap-boxes N as cages to receive the trapped flies for disposal in any desired manner.

The apparatus may be portable or fixed, as desired.

I find it desirable to provide openings O in the sides of the chute, through which the animals may be prodded to cause them to proceed through the chute.

Having thus described my invention, what I claim, and desire to secure by Letters Patent, is—

1. A fly-trap substantially as described comprising a chute having within it means for removing flies from cows and the like, a trap-compartment extending above said chute, and removable trap boxes or cages fitted on said compartment and having openings communicating therewith, and means for closing said openings at will substantially as set forth.

2. In a trap substantially as described the combination of a chute, a trapping-compartment above the same, a door controlling the entrance to said chute, and a hood in front of said door substantially as set forth.

3. In a trap substantially as described, a chute provided with adjustable shades to darken the chute substantially as set forth.

4. A trap comprising a chute and brushes at the opposite sides thereof and inclining rearwardly from their lower to their upper ends substantially as set forth.

5. The combination with the chute of the doors therein converging toward their rear ends and provided on their inner forward sides with brushes substantially as set forth.

6. The combination of the chute, the hinged shades therein, the inclined brushes, and the hinged converging doors provided with brushes substantially as set forth.

7. A trap substantially as described comprising the combination with a chute of doors hinged at their front edges and converging at their rear edges within said chute, provided on their front faces with brushes and having cut-away portions at the lower ends of their converging edges substantially as set forth.

8. The combination in a trap of the chute, inclined brushes and converging doors therein, a swinging light-shield in rear of said doors, and the trapping-compartment above the chute substantially as set forth.

9. In a trap substantially as described the combination of the chute, the trapping-compartment above said chute, and the trap boxes or cages mounted on said compartment and removable substantially as described.

10. A trap substantially as described comprising a chute provided with means for removing flies from animals passing through the chute, and a trapping-compartment arranged above and extending lengthwise over the chute and trap boxes or cages fitted removably to said compartment and communicating therewith substantially as set forth.

CHARLES E. VARNUM.

Witnesses:
JAMES G. ILIFF,
EMERSON E. EVANS.